US007380822B2

(12) United States Patent
Abe

(10) Patent No.: US 7,380,822 B2
(45) Date of Patent: Jun. 3, 2008

(54) AIRBAG AND AIRBAG APPARATUS

(75) Inventor: Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 99 days.

(21) Appl. No.: 11/402,955

(22) Filed: Apr. 13, 2006

(65) Prior Publication Data

US 2006/0237953 A1  Oct. 26, 2006

(30) Foreign Application Priority Data

Apr. 26, 2005 (JP) ............................. 2005-128148

(51) Int. Cl.
*B60R 21/16* (2006.01)
(52) U.S. Cl. ................................. 280/743.1; 280/743.2
(58) Field of Classification Search ................ 280/729, 280/731, 740, 743.1, 743.2
See application file for complete search history.

(56) References Cited

U.S. PATENT DOCUMENTS

| 5,249,824 | A | * | 10/1993 | Swann et al. ................ 280/729 |
| 5,678,858 | A | * | 10/1997 | Nakayama et al. ....... 280/743.2 |
| 5,848,805 | A | * | 12/1998 | Sogi et al. ................ 280/743.2 |
| 5,997,037 | A | * | 12/1999 | Hill et al. ................. 280/743.2 |
| 6,086,092 | A | | 7/2000 | Hill |
| 6,419,267 | B1 | * | 7/2002 | Hashimoto et al. ....... 280/743.1 |
| 6,676,158 | B2 | * | 1/2004 | Ishikawa ................... 280/743.1 |
| 6,899,352 | B2 | | 5/2005 | Yamamoto et al. |
| 7,093,854 | B2 | * | 8/2006 | Fischer et al. ............ 280/743.2 |
| 7,111,866 | B2 | * | 9/2006 | Abe et al. ..................... 280/729 |
| 2006/0151976 | A1 | * | 7/2006 | Abe ............................. 280/729 |
| 2006/0175819 | A1 | * | 8/2006 | Abe ........................... 280/743.2 |
| 2006/0197320 | A1 | * | 9/2006 | Abe ............................. 280/729 |
| 2007/0024043 | A1 | * | 2/2007 | Abe ........................... 280/743.2 |
| 2007/0045997 | A1 | * | 3/2007 | Abe et al. ..................... 280/729 |

FOREIGN PATENT DOCUMENTS

| EP | 1 674 351 | 6/2006 |
| JP | 1311930 | 12/1989 |
| JP | 13119630 | 12/1989 |
| JP | 10081191 | 3/1998 |
| JP | 2003276554 | 10/2003 |

* cited by examiner

*Primary Examiner*—Toan To
(74) *Attorney, Agent, or Firm*—Manabu Kanesaka

(57) ABSTRACT

An internal part of an airbag is partitioned into a first chamber and a second chamber by first and second inner panels. Each of outer peripheral edge portions of the inner panels is stitched by a tear seam. Overhanging portions protrude from outer peripheries of each of the first and second inner panels, and each of the overhanging portions is stitched by a seam. The thickness of the airbag is relatively small by a continuum of the first inner panel and the second inner panel until the internal pressure of the first chamber reaches a predetermined pressure. At the predetermined pressure, the tear seam is broken, and each of the first and second inner panels is separated resulting in an increase in the thickness of the airbag. The airbag sufficiently absorbs the impact of the occupant, and does so in a relatively soft manner.

9 Claims, 8 Drawing Sheets

AIRBAG AND AIRBAG APPARATUS

BACKGROUND OF THE INVENTION AND RELATED ART STATEMENT

The present invention relates to an airbag and an airbag apparatus for protecting a human body in an emergency of a car crash or the like by means of expansion, and more particularly and preferably relates to the airbag and the airbag apparatus provided in a steering wheel of a motor vehicle.

In an emergency of a car crash or the like, various kinds of airbag apparatuses, such as that for use in a driver's seat or the like, are employed so as to protect an occupant. The airbag apparatus for use in the driver's seat is provided with an airbag formed by stitching up peripheral portions of a front panel at an occupant side and a rear panel at an opposite side together. An opening for engaging an inflator to receive a tip end side of the inflator is provided at a center of the rear panel. A periphery of the opening is attached to a retainer by means of a bolt, a pin, and a rivet or the like. In the rear panel, a venthole is provided for absorbing an impact caused by the occupant seated on the driver's seat when hitting the airbag, by discharging gas in the airbag.

In Japanese Unexamined Patent Application Publication Nos. 1-311930 and 1-81191, an airbag in which an inner panel (called "inside gas bag" in the Japanese Unexamined Patent Application Publication No. 1-311930) is provided in a manner so as to hang across an opening for an inflator in a rear panel, and a front panel, and in which space in the airbag is partitioned into a first chamber at a center and a second chamber surrounding the first chamber, is described. A continuous opening that allows the first chamber to communicate with the second chamber is provided in the inside gasbag. When the inflator is activated, the first chamber is expanded first, and the second chamber is then expanded in a serial manner.

Accordingly, it is an object of the present invention to provide an airbag whose internal portion is partitioned into a first chamber and a second chamber by means of an inner panel being connected to a front panel of the airbag so that the second chamber of the airbag to be promptly expanded at a time when the airbag is expanded.

Further objects and advantages of the invention will be apparent from the following description of the invention and the associated drawings.

SUMMARY OF THE INVENTION

An airbag according to a first embodiment of the invention is expanded by gas blown out from a gas generator, and includes a front panel disposed at an occupant side, and a rear panel disposed at a side opposite to the occupant side, in which the front panel and the rear panel are combined at each of peripheral edge portions thereof. The airbag includes an opening for the gas generator provided at a center of the rear panel, and an inner panel partitioning an internal part of the airbag into a first chamber at a center, and a second chamber surrounding the first chamber. A continuous opening for allowing the first chamber to communicate with the second chamber is provided in the inner panel. The inner panel includes a first inner panel at a front panel side, and a second inner panel at a rear panel side, and each of the first inner panel and the second inner panel includes each of overhanging portions respectively overhanging from an outer periphery. A center portion or vicinity thereof of the first inner panel is combined with the front panel, and a peripheral edge portion of the first inner panel is combined with a peripheral edge portion of the second inner panel by a combination device. An opening is disposed in a substantially concentric manner with the opening of the rear panel and is provided at a center portion of the second inner panel.

The combination device includes a first combination device of low strength for combining each of the peripheral edge portions of the first inner panel and the second inner panel until an internal gas pressure of the first chamber reaches a predetermined pressure, and a second combination device of high strength for combining each of the overhanging portions of the first inner panel and the second inner panel. The first combination device releases a combination when the internal gas pressure of the first chamber reaches a pressure not less than the predetermined pressure.

An airbag according to another embodiment of the invention is also expanded by gas blown out from a gas generator, and includes a front panel disposed at an occupant side, and a rear panel disposed at a side opposite to the occupant side, in which the front panel and the rear panel are combined at each of peripheral edge portions thereof. The airbag includes an opening for the gas generator provided at a center of the rear panel, and an inner panel for partitioning an internal part of the airbag into a first chamber at a center, and a second chamber surrounding the first chamber. A continuous opening for allowing the first chamber to communicate with the second chamber is provided in the inner panel, and in which the inner panel comprises a first inner panel at a front panel side, and a second inner panel at a rear panel side.

A center portion or vicinity thereof of the first inner panel is combined with the front panel, and a peripheral edge portion of the first inner panel is combined with a peripheral edge portion of the second inner panel by a low strength combination device. An opening is disposed in a substantially concentric manner with the opening of the rear panel and provided at a center portion of the second inner panel.

A tether member connects the front panel and the rear panel in the airbag. The combination device combines the first inner panel and the second inner panel such that an interval between the front panel and the rear panel is caused to be relatively small until an internal gas pressure of the first chamber reaches a predetermined pressure. The tether member connects the front panel and the rear panel such that an interval between the front panel and the rear panel is caused to be relatively large, and in which the combination device releases a combination when the internal gas pressure of the first chamber reaches a pressure not less than the predetermined pressure.

An airbag according to another embodiment of the invention is also expanded by gas blown out from a gas generator, and includes a front panel disposed at an occupant side, and a rear panel disposed at a side opposite to the occupant side, in which the front panel and the rear panel are combined at each of peripheral edge portions thereof. An opening for the gas generator is provided at a center of the rear panel, and the airbag includes an inner panel for partitioning an internal part of the airbag into a first chamber at a center, and a second chamber surrounding the first chamber. A continuous opening for allowing the first chamber to communicate with the second chamber is provided in the inner panel, and in which the inner panel comprises a first inner panel at a front panel side, and a second inner panel at a rear panel side. A center portion or vicinity thereof of the first inner panel is combined with the front panel, and a peripheral edge portion of the first inner panel is combined with a peripheral edge portion of the second inner panel by a combination device. An opening disposed in a substantially concentric manner with the opening of the rear panel is provided at a center portion of the second inner panel.

A tether member connects the front panel and the rear panel in the airbag. The combination device combines the first inner panel and the second inner panel such that an interval between the front panel and the rear panel is caused to be relatively small, and the tether member connects the front panel and the rear panel such that an interval between the front panel and the rear panel is caused to be relatively large. The airbag includes, in the first inner panel or the second inner panel, a low strength portion for disuniting the first inner panel or the second inner panel into the front panel side and the rear panel side by breaking when the internal gas pressure of the first chamber reaches a predetermined pressure.

According to another aspect of the invention, each of the peripheral edge portions of the first inner panel and the second inner panel has a partially non-combined portion, and the first chamber is allowed to communicate with the second chamber via the non-combined portion.

According to another embodiment of the invention, an airbag apparatus includes an airbag and a gas generator having a gas blowing outlet. At least a tip end portion of the gas generator is disposed in an internal part of the airbag, and the gas blowing outlet is disposed in the internal part of the airbag.

In an airbag and an airbag apparatus according to the present invention, when the airbag is expanded, a first chamber is expanded first and then a second chamber is expanded by gas discharged from the first chamber to the second chamber via a continuous opening. A front panel of the airbag is caused to remain at a rear panel side by means of a continuum of a first inner panel and a second inner panel until internal pressure of the first chamber reaches the predetermined pressure, and an interval of the front panel and the rear panel, namely a thickness of the airbag remains to be relatively small. Accordingly, a volume of the second chamber is also relatively small at an early stage of the expansion of the airbag resulting in a prompt increase to have high internal pressure of the second chamber by means of the gas discharged from the first chamber. Consequently, the second chamber is expanded earlier.

In the airbag according to one embodiment of the invention, when internal pressure of the first chamber reaches a predetermined pressure, a combination provided by means of a combination device provided with low strength is released and the first inner panel is separated from the second inner panel, and the thickness of the airbag is increased.

In the airbag according to another embodiment of the invention, when the internal pressure of the first chamber reaches the predetermined pressure, the portion provided with the low strength is broken and the first inner panel or the second inner panel is disunited into the rear panel side and a front panel side, and the thickness of the airbag is increased. As a result, an impact applied to an occupant is fully absorbed by the expanded airbag.

Further, according to the first embodiment, when the thickness of the airbag is brought to a sufficient state, the continuum of each of overhanging portions of the first inner panel and the second inner panel is strained between the front panel and the rear panel, and the front panel is stopped from expanding further outwardly to an occupant side.

In addition, in the tether embodiment, the tether member is strained between the front panel and the rear panel, and the front panel is stopped from expanding further outwardly to the occupant side. As a result, the airbag is prevented from being expanded toward the occupant side in an excessively protruding manner.

In the present invention, the moving speed of the front panel toward the occupant side is relatively gradual. This is because the outwardly expanding motion of the front panel to the occupant side is once stopped in the middle of expansion of the airbag by the continuum of the first inner panel and the second inner panel, as described above. Accordingly, the occupant comes into contact with the front panel in a relatively soft manner.

Further, in certain embodiments of the present invention, a dividing wall between the first chamber and the second chamber disappears due to the separation of the first panel and the second panel, or to a break of the first inner panel or the second inner panel. As a result, the entire internal pressure of the airbag on completion of the expansion is caused to be substantially uniform.

In another embodiment of the present invention, each of the peripheral edge portions of the first inner panel and the second inner panel has a partially non-combined portion. Therefore, the continuous opening between the first chamber and the second chamber can be very easily constructed.

DETAILED DESCRIPTION OF THE PREFERRED EMBODIMENTS

Hereinbelow, an embodiment of the present invention will be explained with reference to the drawings.

Figure 1:
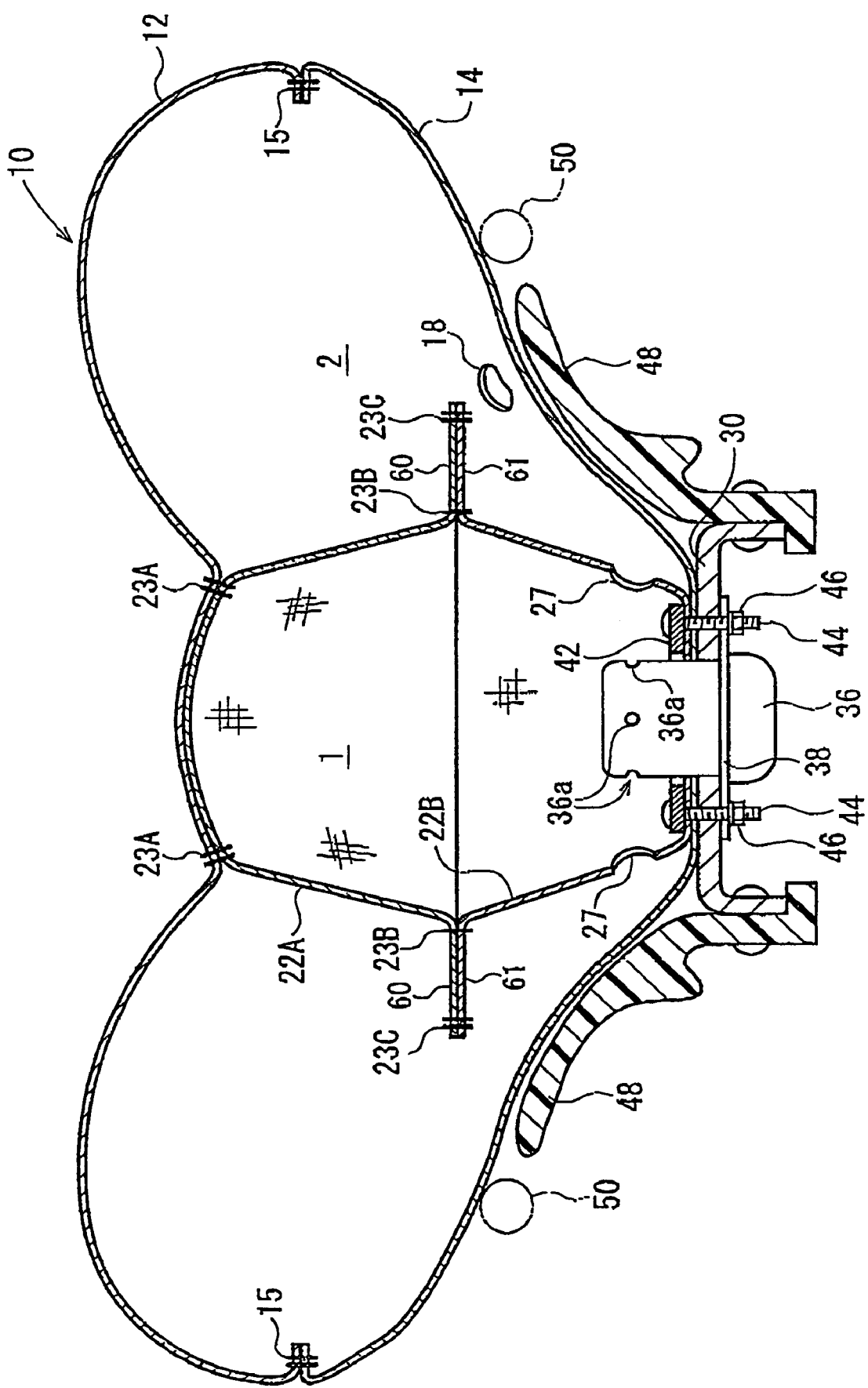
FIG. 1 is a cross section illustrating an airbag for use in a driver's seat of a motor vehicle and an airbag apparatus when the airbag is in the middle of expansion according to an embodiment of the invention.
Figure 2:
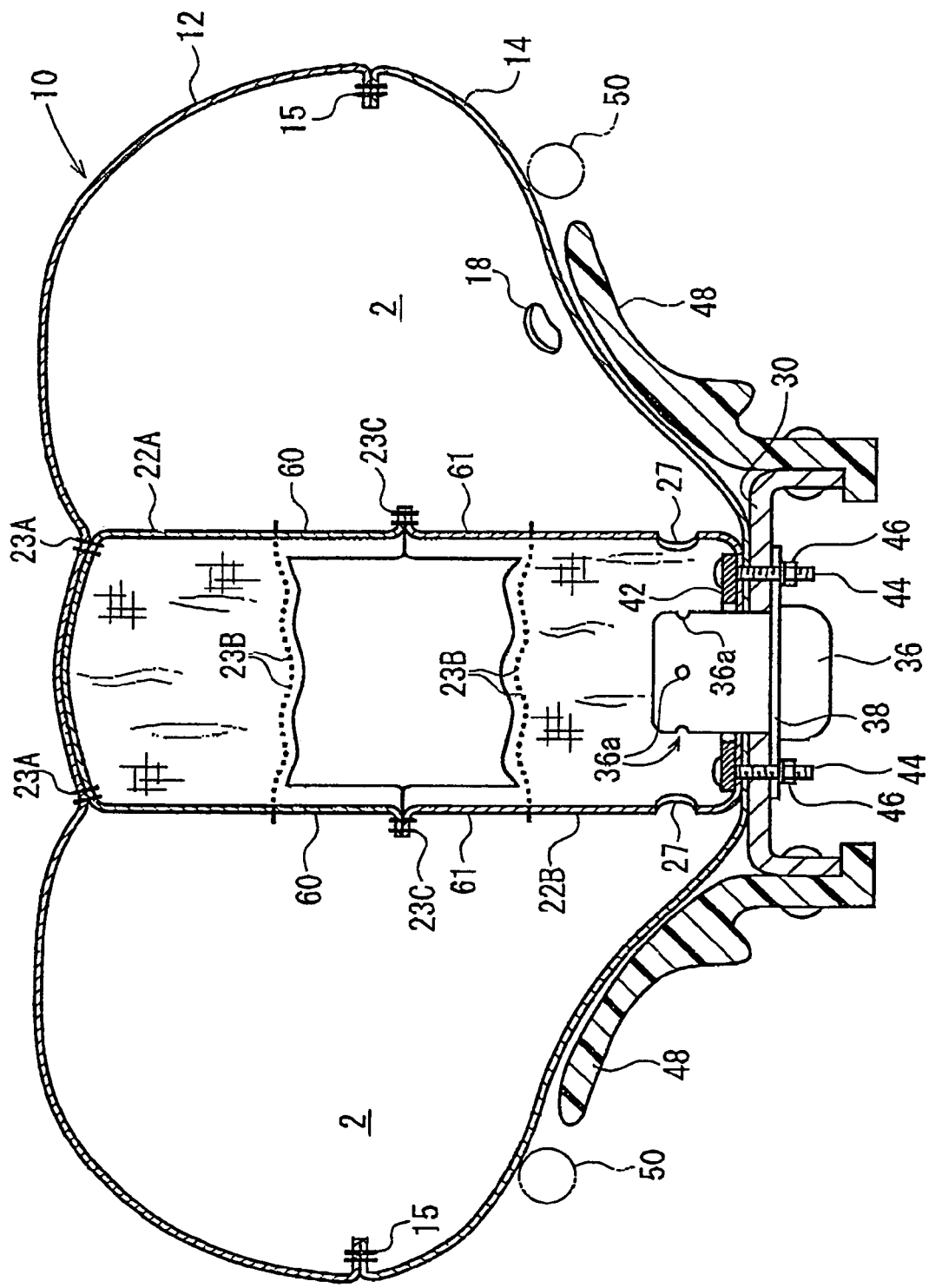
FIG. 2 is a cross section illustrating the airbag and the airbag apparatus of FIG. 1 on completion of airbag expansion.
Figure 3:
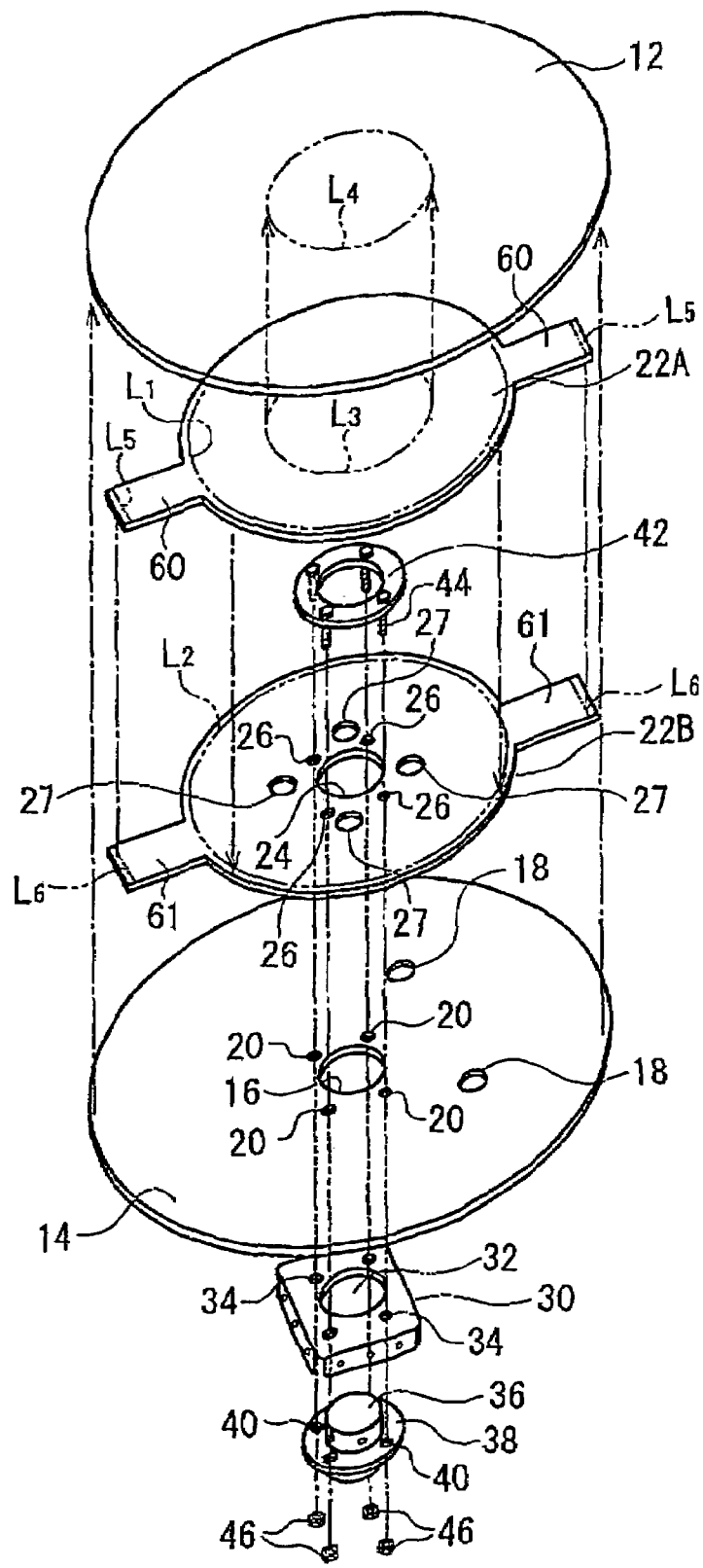
FIG. 3 is an exploded perspective view illustrating the airbag and the airbag apparatus of FIG. 1.
Figure 4:
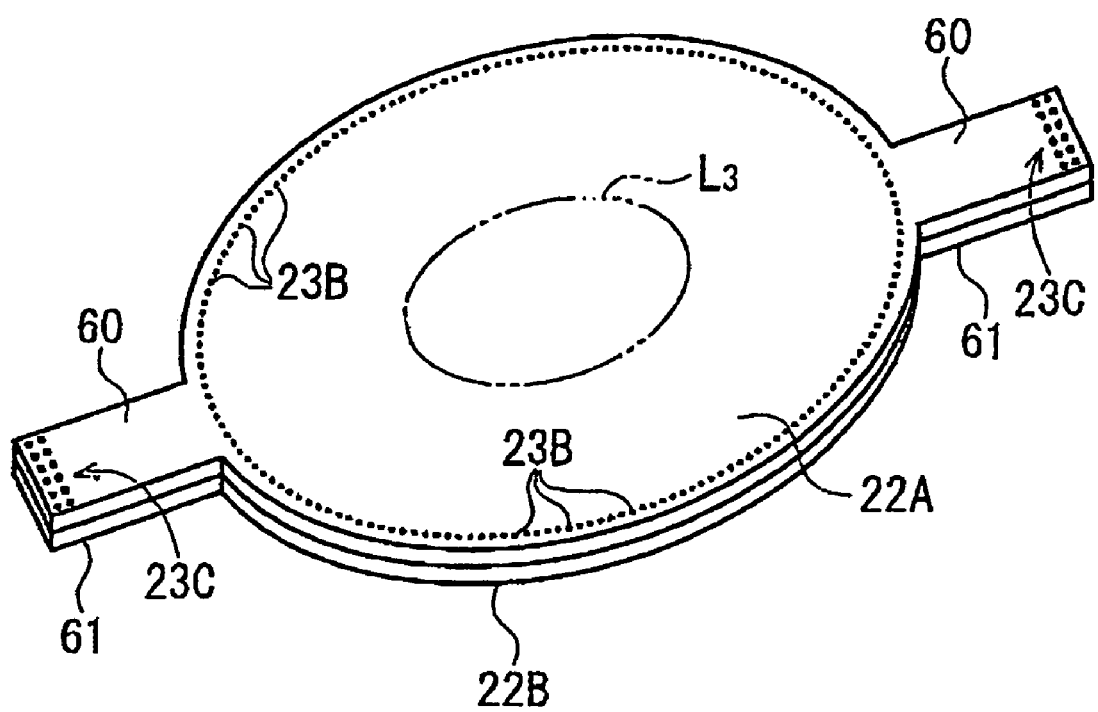
FIG. 4 is a perspective view illustrating a combination structure of a first inner panel and a second inner panel of the airbag of FIG. 1.

FIGS. 1 and 2 are cross sections illustrating an airbag 10 for use in a driver's seat of a motor vehicle and an airbag apparatus according to a first embodiment of the invention. FIG. 1 illustrates the airbag when in the middle of expansion and FIG. 2 illustrates the airbag 10 on completion of expansion. FIG. 3 is an exploded perspective view illustrating the airbag 10 and the airbag apparatus. FIG. 4 is a perspective view illustrating a combination structure of a first inner panel 22A and a second inner panel 22B.

The airbag 10 is provided with each of a front panel 12 formed of woven cloth having a substantially round shape, a rear panel 14, the first inner panel 22A, and the second inner panel 22B. Both of the front panel 12 and the rear panel 14 have the same diameter and are formed into a bag-like body by stitching each of outer peripheral edge portions thereof together, with a seam 15 formed of a thread or the like. The stitched portion has a ring shape that circulates along an outer periphery of the front panel 12 and the rear panel 14. Further, the seam 15 is formed of a high strength seam that is not broken (namely, does not release a combination of the front panel 12 and the rear panel 14) even when an internal pressure of the airbag 10 is caused to be a pressure not less than the predetermined pressure.

In the rear panel 14, an opening 16 for an inflator (gas generator) and a venthole 18 are provided. The opening 16 for the inflator is disposed at a center of the rear panel 14. A bolt insertion hole 20 is disposed around the opening 16 for the inflator.

The first inner panel 22A and the second inner panel 22B are disposed in an internal part of the airbag 10. The first and the second inner panels, 22A and 22B are disposed in a substantially concentric manner with the front panel 12 and the rear panel 14, and each of outer peripheral edge portions is stitched together by means of a tear seam 23B serving as a first combination device. The internal part of the airbag 10 is partitioned into a first chamber 1 at a center and a second chamber 2 surrounding the first chamber 1 by the first and second inner panels, 22A and 22B. The first chamber 1 is located inside the first and the second inner panels, 22A and 22B.

A center portion of the first inner panel 22A of a front panel 12 side (a portion to be a tip end side of the first inner panel 22A when the airbag 10 is in a state of being expanded) is stitched with a center portion of the front panel 12 by means of a seam 23A.

As shown in FIG. 3, the tear seam 23B combines each of the inner panels, 22A and 22B, along circular stitching (combination) lines, $L_1$ and $L_2$ that circulate around outer peripheral edge portions of each of the first and second inner panels, 22A and 22B. In addition, the seam 23A combines the first inner panel 22A and the front panel 12 along circular stitching lines, $L_3$ and $L_4$ that respectively circulate a center portion of the inner panel 22A and the center portion of the front panel 12.

The tear seam 23B is a low strength seam that releases the combination of each of the first and second inner panels, 22A and 22B by breaking when internal pressure of the first chamber 1 is caused to be a pressure not less than the predetermined pressure. In contrast., the seam 23A is a high strength seam that does not release a combination of each of the first inner panel 22A and the front panel 12 even when the internal pressure of the first chamber 1 (and the internal pressure of the airbag 10) reaches the predetermined pressure.

In this embodiment, overhanging portions, 60 and 61, protrude from outer peripheries of the first and second inner panels, 22A and 22B, and each of the overhanging portions, 60 and 61 is stitched by means of a seam 23C serving as a second combination device. Further, the overhanging portions, 60 and 61 are strap-like or belt-like portions extending at a predetermined length in a radial direction from each of the outer peripheries of the first and second inner panels, 22A and 22B, and each of the tip ends thereof is stitched by means of the seam 23C in this embodiment. Line segments, $L_5$ and $L_6$ in FIG. 3 indicate stitching lines formed by means of the seam 23C. The seam 23C is a high strength seam that is not broken even when the internal pressure of the airbag 10 is caused to be a pressure not less than the predetermined pressure.

The respective overhanging portions, 60 and 61 are two in number in this embodiment and each of the overhanging portions, 60 and 60, and 61 and 61 is disposed at a side opposite to each other in a positional relationship across a center of the first and second inner panels, 22A and 22B. However, the number of overhanging portions, 60 and 61, and a disposition thereof is not limited thereto. Further, in the present invention, continuum of the overhanging portions, 60 and 61 may be preferably disposed at areas where the front panel 12 is supposed to be facing a head portion or a chest portion of an occupant. As a result, the front panel 12 is prevented from being excessively projected toward the head portion or the chest portion of the occupant when the airbag 10 is expanded.

A length of the continuum of the overhanging portions, 60 and 61 is appropriately set corresponding to a predetermined thickness (an interval of the front panel 12 and the rear panel 14 when the continuum of the first panel 22A, the overhanging portions, 60 and 61, and the second panel 22B are strained between the front panel 12 and the rear panel 14, as shown in FIG. 2) of the airbag 10 on completion of the expansion at each of the disposing positions of the overhanging portions, 60 and 61.

Each of the overhanging portions, 60 and 61 may be provided with the first inner panel 22A and the second inner panel 22B in an integral manner or may be combined with the first inner panel 22A and the second inner panel 22B by means of stitching work or the like, after being formed into separate bodies.

An opening 24 for the inflator that is substantially concentrically disposed with the opening 16 for the inflator of the rear panel 14 is provided at a center portion (a portion to be a rear end side of the second inner panel 22B when the airbag 10 is in a state of being expanded) of the second inner panel 22B at the rear panel side. These openings, 16 and 24 for the inflator have a substantially round shape. In addition, a bolt insertion hole 26 overlapping with the bolt insertion hole 20 of the rear panel 14 is provided around the opening 24 for the inflator in the second inner panel 22B.

In the second inner panel 22B, a plurality of continuous openings 27 is provided. In this embodiment, a continuous opening 27 is formed on an extension line in a gas blowing out direction of the inflator 36, described later, disposed in the first chamber 1 via the openings, 16 and 24 for the inflator, namely at a position facing a gas blowing outlet 36a of the inflator 36.

On the other hand, a reinforcing patch or the like may be attached to peripheral edge portions of the openings, 16 and 24 for the inflator, the continuous hole 27, and the venthole 18.

In a retainer 30 for attaching the airbag 10, an inflator attaching opening 32 is provided at a center thereof and a bolt insertion hole 34 is disposed around the same.

The inflator 36 has a substantially cylindrical shape and the gas blowing outlet 36a is disposed at a side peripheral face of a tip end side in a cylindrical shaft direction of the inflator 36. In this embodiment, the gas blowing outlets 36a disposed in a peripheral direction of the inflator 36 at even intervals are four in number. The inflator 36 is constructed so as to blow out the gas from the gas blowing outlet 36a in a radial direction. A flange 38 for fixing the inflator 36 is projected from a middle portion (rear end side from the gas blowing outlet 36a) of a side peripheral face of the inflator 36 in the cylindrical shaft direction. A bolt insertion hole 40 is formed in the flange 38. A tip end side of the inflator 36 is fit into the inflator attaching opening 32 of the retainer 30.

When the airbag 10 is attached to the retainer 30, a peripheral edge portion of the opening 24 for the inflator of the second inner panel 22B is overlapped with a peripheral edge portion of the opening 16 for the inflator of the rear panel 14, and is further overlapped with a peripheral edge portion of the inflator attaching opening 32 of the retainer 30. In addition, a stud bolt 44 of a pressing ring 42 is inserted into each of the bolt insertion holes 26, 20, 34, 40 of the second inner panel 22B, the rear panel 14, the retainer 30, and the flange 38, respectively, and a nut 46 is threaded onto a tip end of the stud bolt 44. Thereby the second inner panel 22B, the rear panel 14, and the inflator 36 are fixed to the retainer 30.

Consequently, a peripheral edge portion of the opening 24 for the inflator of the second inner panel 22B is connected to a peripheral edge portion of the opening 16 for the inflator of the rear panel 14 and each of the outer peripheral edge portions of the first and second inner panels, 22A and 22B is connected together, and further, a center portion of the first inner panel 22A is connected to the front panel 12.

Thereafter, the airbag 10 is folded and the module cover 48 is attached to the retainer 30 in a manner so as to cover the folded body of the airbag 10 resulting in constructing the airbag apparatus. The airbag apparatus is mounted on a steering wheel 50 of the motor vehicle.

When a collision or the like occurs with the motor vehicle where the thus constructed airbag apparatus is mounted, the gas blows out from the inflator 36 being activated into an internal part of the airbag 10. The airbag 10 is expanded by the gas and pushes open the module cover 48 resulting in developing into the internal part of a cabin of the motor vehicle.

In the airbag 10, the first chamber 1 is expanded first, the gas in the first chamber 1 flows into the second chamber 2 passing through the continuous opening 27, and the second chamber 2 is thereby expanded. The front panel 12 is detained at a rear panel 14 side by the continuum of the first inner panel 22A and the second inner panel 22B until the internal pressure of the first chamber 1 reaches the predetermined pressure, and an interval of the front panel 12 and the rear panel 14, namely a thickness of the airbag 10 remains to be relatively small. Accordingly, a volume of the second chamber 2 also remains to be relatively small at an early stage of the expansion of the airbag. An internal pressure of the second chamber 2 is promptly caused to be high by the gas from the first chamber 1. Consequently, the second chamber 2 is expanded earlier.

Thereafter, when the internal pressure of the first chamber 1 reaches the predetermined pressure, the tear seam 23B breaks and the first inner panel 22A is separated from the second inner panel 22B resulting in increase of the thickness of the airbag 10. As a result, an impact caused when the occupant hits the expanded airbag 10 is sufficiently absorbed.

Further, a moving speed of the front panel 12 toward the occupant side is relatively gradual because the outwardly expanding motion of the front panel 12 to the occupant side is once stopped in the middle of expansion of the airbag by the continuum of the first inner panel 22A and the second inner panel 22B, as described above. Accordingly, the occupant comes into contact with the front panel 12 in a relatively soft manner.

Furthermore, a dividing wall between the first chamber 1 and the second chamber 2 disappears due to separation of the first inner panel 22A and the second inner panel 22B, and thereby entire internal pressure of the airbag 10 is caused to be substantially uniform on completion of expansion thereof.

In the airbag 10, when the thickness of the airbag 10 is fully increased due to the separation of the first inner panel 22A and the second inner panel 22B, the continuum of the first inner panel 22A, each of the overhanging portions, 60 and 61, and the second inner panel 22B is strained between the front panel 12 and the rear panel 14, and the front panel 12 is stopped from being further outwardly expanded (protruded) to an occupant side, as shown in FIG. 2.

In addition, the continuous opening 27 that allows the first chamber 1 to communicate with the second chamber 2 is disposed on the extension line of the gas blowing out direction of the inflator 36 that is disposed in the first chamber 1, namely at a position facing the gas blowing outlet 36a of the inflator 36, in the airbag 10. Therefore, when the inflator is activated, the gas is blown out from the gas blowing outlet 36a to the continuous opening 27. Accordingly, the gas from the inflator 36 is easy to flow into the second chamber 2 passing through the continuous opening 27. Consequently, the expansion of the second chamber 2 is further accelerated.

Figure 5:
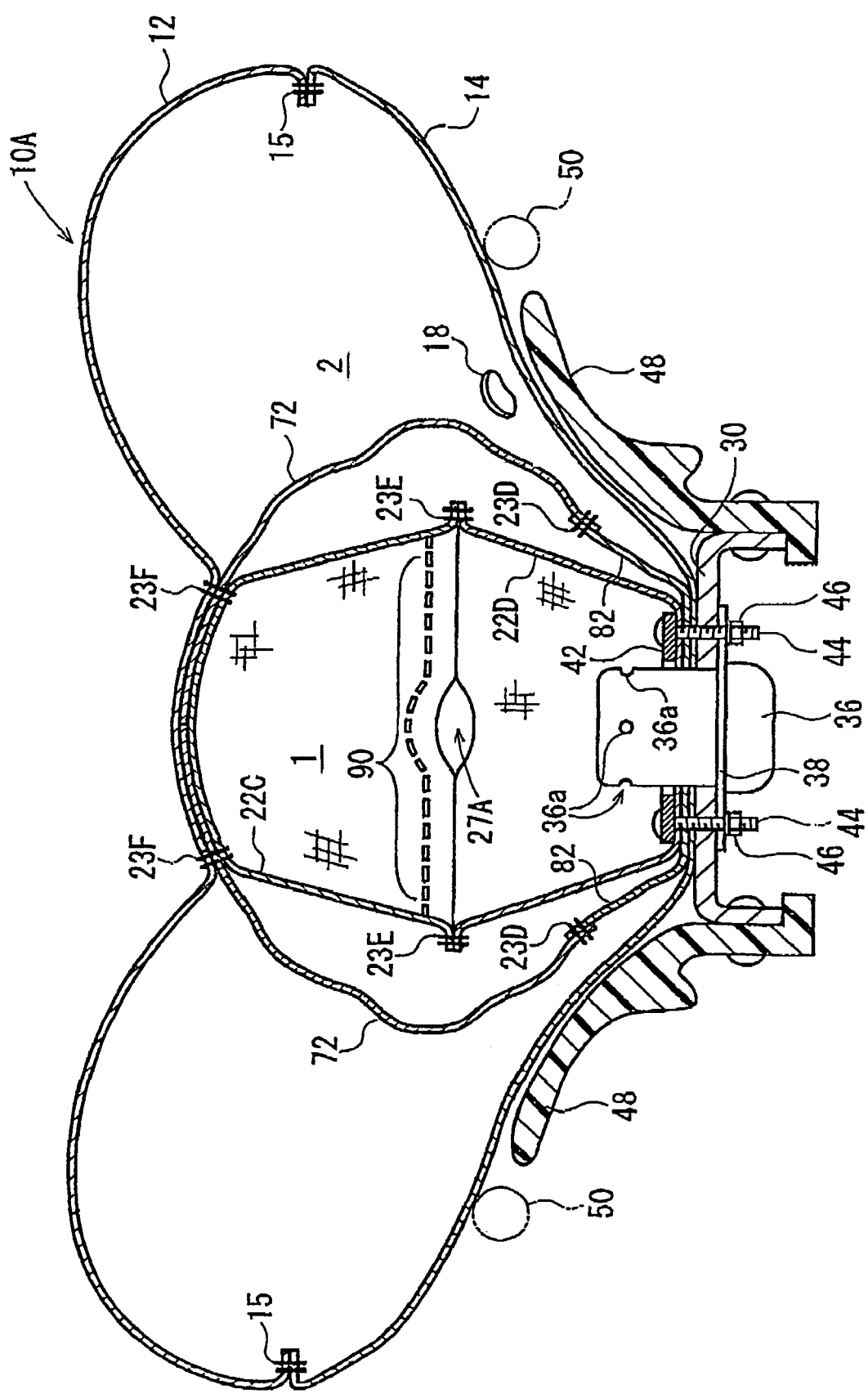
FIG. 5 is a cross section illustrating an airbag for use in a driver's seat of a motor vehicle and an airbag apparatus when the airbag is in the middle of expansion according to another embodiment of the invention.
Figure 6:
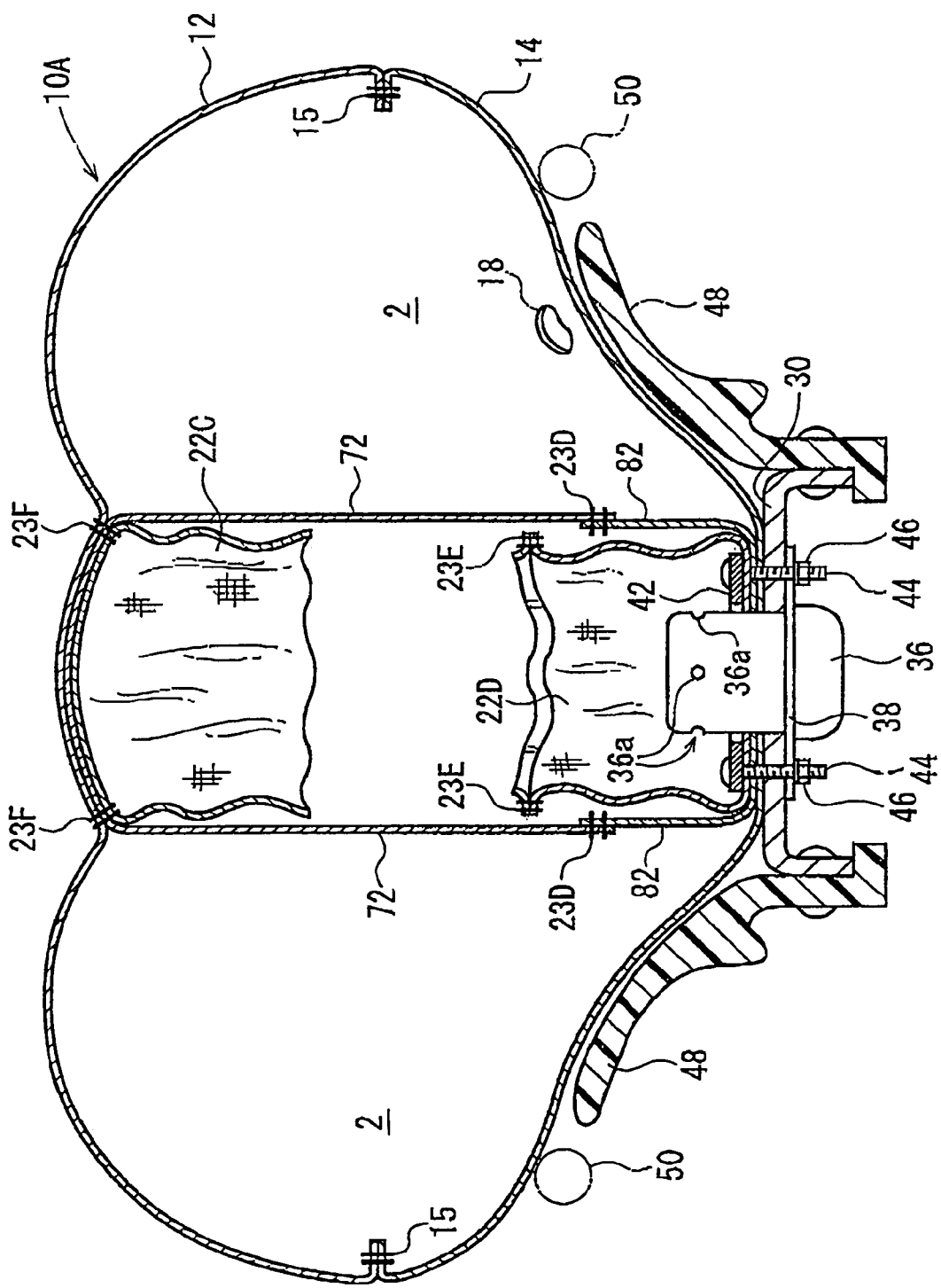
FIG. 6 is a cross section illustrating the airbag and the airbag apparatus of FIG. 5 on completion of airbag expansion.
Figure 7:
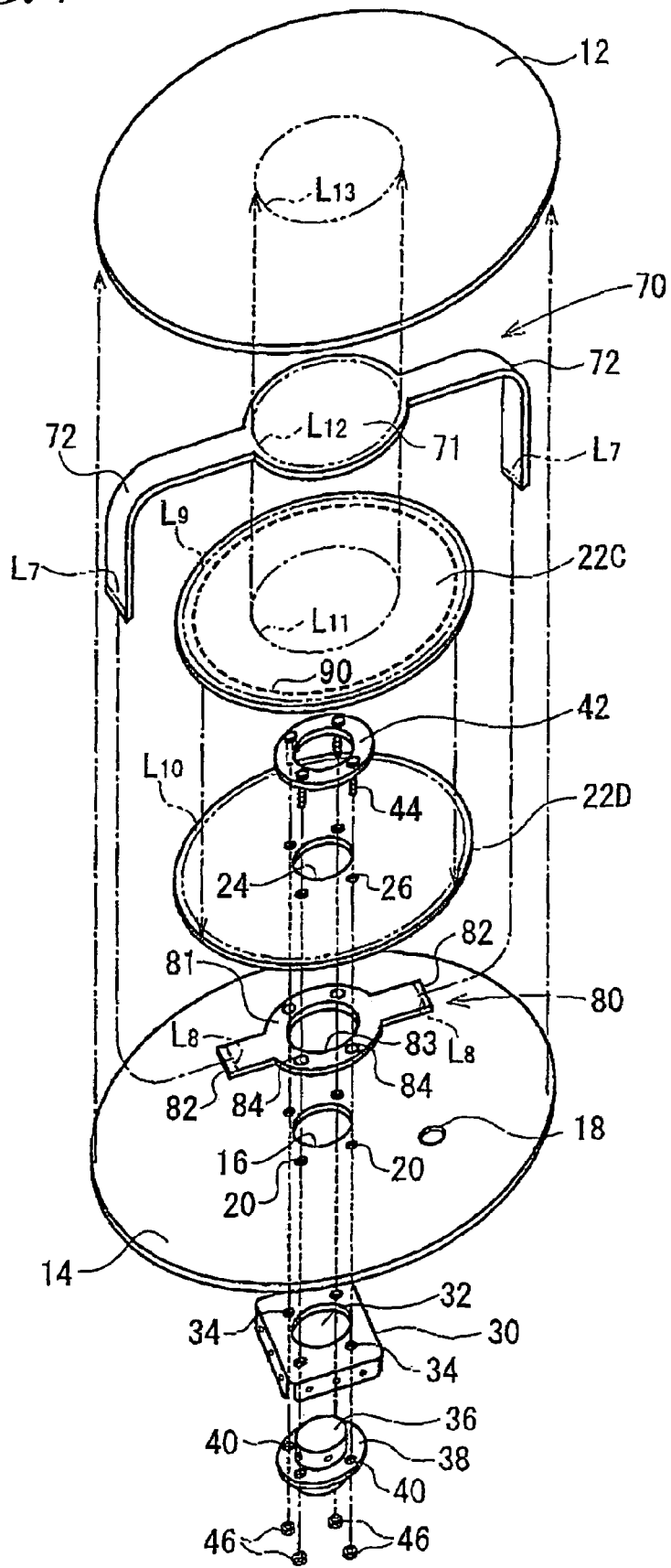
FIG. 7 is an exploded perspective view illustrating the airbag and the airbag apparatus of FIG. 5.
Figure 8:
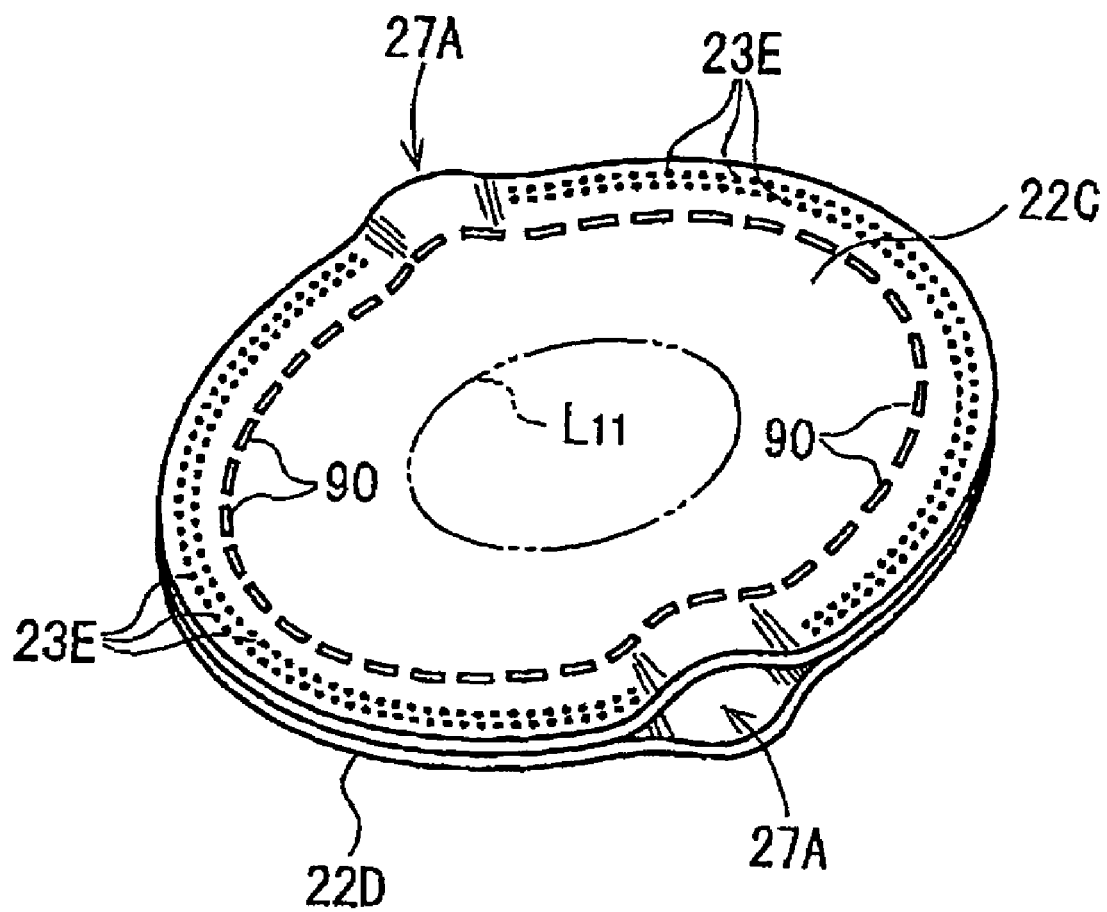
FIG. 8 is an exploded perspective view illustrating a combination structure of a first inner panel and a second inner panel of the airbag of FIG. 5.

FIGS. 5 and 6 are cross sections illustrating an airbag 10A for use in the driver's seat of the motor vehicle, and an airbag apparatus according to another embodiment of the invention. FIG. 5 illustrates the airbag 10A in the middle of expansion and FIG. 6 illustrates the airbag 10A on completion of the expansion. FIG. 7 is an exploded perspective view illustrating an airbag 10A and the airbag apparatus and FIG. 8 is an exploded perspective view illustrating a combination structure of a first inner panel 22C and a second inner panel 22D.

The airbag 10A is provided with the front panel 12, the rear panel 14, the first inner panel 22C, and the second inner panel 22D, each of which is formed of substantially round shaped woven cloth, and tether members, 70 and 80. In this embodiment, each of the outer peripheral edge portions of the front panel 12 and the rear panel 14 is also stitched together by means of the high strength seam 15 and thereby an outline of the bag-like shaped airbag 10A is constructed. In addition, the first inner panel 22C and the second inner panel 22D, and the tether members, 70 and 80 are provided inside thereof.

Further, in this embodiment, the opening 16 for the inflator (gas generator), the venthole 18, and the bolt insertion hole 20 are also formed in the rear panel 14, and the opening 16 for the inflator is disposed at the center of the rear panel 14, and the bolt insertion hole 20 is disposed at a periphery of the opening 16 for the inflator.

The tether member 70 is provided with a base piece portion 71 disposed at the center of the front panel 12, and two tether portions, 72 and 72 having a strap-like shape or a belt-like shape, extending outward from an outer periphery of the base piece portion 71 in a radial direction in this embodiment. The base piece portion 71 is formed of round shaped woven cloth having a diameter smaller than that of the front panel 12 and the first inner panel 22C, and tether members, 72 and 72 are disposed at a side opposite to each other in a positional relationship across a center of the base piece portion 71.

In this embodiment, the tether member 80 is provided with a base piece portion 81 disposed at a center part of the rear panel 14, and two tether portions, 82 and 82 having a strap-like shape or a belt-like shape, extending outward from an outer periphery of the base piece portion 81 in a radial direction. The base piece portion 81 is formed of round shaped woven cloth having a diameter smaller than that of the rear panel 14 and the second inner panel 22D, and the tether members, 82 and 82 are disposed at a side opposite to each other in a positional relationship across a center of the base piece portion 81. An opening 83 for the inflator that overlaps with the opening 16 for the inflator of the rear panel 14 is provided at a center of the base piece portion 81. Further, a bolt insertion hole 84 that overlaps with the bolt insertion hole 20 is disposed around the opening 83 for the inflator.

Each of the tip end portions of the tether portions, 72 and 82 of these tether members, 70 and 80 is stitched by means of a seam 23D. Line segments $L_7$ and $L_8$ in FIG. 7 indicate stitching lines that are formed by means of the seam 23D. The seam 23D is a high strength seam that is not broken even when the internal pressure of the airbag 10A is caused to be a pressure not less than the predetermined pressure.

The first inner panel 22C and the second inner panel 22D are disposed between each of the base piece portions, 71 and 81. Each of the outer peripheral portions of the first inner panel 22C and the second inner panel 22D is stitched by means of a seam 23E along stitching lines, $L_9$ and $L_{10}$ (in FIG. 7), and thereby the first chamber 1 is formed inside the first inner panel 22C and the second inner panel 22D. The seam 23E is a high strength seam that is not broken even when the internal pressure of the first chamber 1 is caused to be the predetermined pressure. In this embodiment, the overhanging portion is not provided in the first inner panel 22C and the second inner panel 22D.

Further, the seam 23E is extending in a manner so as to circulate the outer peripheral edge portions of the first inner panel 22C and the second inner panel 22D, however, areas where each of the outer peripheral edge portions of the first and second inner panels, 22C and 22D is not stitched by means of the seams 23E (namely, non-combined portion) partially exists in this embodiment, as shown in FIG. 8. The non-combined portion serves as a continuous opening 27A between the first chamber 1 and the second chamber 2 in this embodiment.

As illustrated in the drawings, two continuous openings 27A and 27A are provided in this embodiment and are disposed at a side opposite to each other in a positional relationship across a center of the first and second inner panels, 22C and 22D. However, the number of the continuous openings 27A and 27A, and the disposition thereof are not limited thereto. In addition, a continuous opening may be also provided in a manner so as to form an opening in the first and second inner panels, 22C and 22D in this embodiment.

In this embodiment, the first inner panel 22C, the base piece portion 71, and the front panel 12 are disposed in a substantially concentric manner, and a center portion of the first inner panel 22C (a portion to be a tip end side of the first inner panel 22C when the airbag 10A is in a state of being expanded) and a base piece 71 are stitched with the center portion of the front panel 12 by means of a common seam 23F. Circular lines, $L_{11}$, $L_{12}$, and $L_{13}$ in FIG. 7 respectively indicate stitching lines formed by means of the common seam 23F. As illustrated in the drawings, the seam 23E is extending in a manner so as to circulate around the peripheral edge portion of the base piece portion 71.

The opening 24 for the inflator that is disposed in a substantially concentric manner with the opening 16 for the inflator of the rear panel 14, and the opening 83 for the inflator of the base piece portion 81, is also provided at a center portion of the second inner panel 22D at the rear panel 14 side (a portion to be a rear end side of the second inner panel 22D when the airbag 10A is in a state of being expanded), in this embodiment. Further, the bolt insertion hole 26 overlapping with the bolt insertion holes, 20 and 84 is disposed around the opening 24 for the inflator.

In this embodiment, a low strength portion 90 is disposed in the first inner panel 22C. In this embodiment, the low strength portion 90 is formed by means of perforated line that is extending in a manner so as to circulate an area between each of the stitching lines, $L_9$ and $L_{11}$ (namely each of the seams 23E and 23F). The low strength portion 90 is configured so as to be broken when the internal pressure of the first chamber 1 is caused to be a pressure not less than the predetermined pressure, and to disunite the first inner panel 22C into a center side from the low strength portion 90 (a seam 23F side) and the outer periphery side (a seam 23E side).

When the airbag 10A is attached to the retainer 30, each of a peripheral edge portions of the opening 24 for the inflator of the second inner panel 22D and the opening 83 for the inflator of the base piece portion 81 is overlapped with a peripheral edge portion of the opening 16 for the inflator of the rear panel 14, and is further overlapped with a peripheral edge portion of the inflator attaching opening 32 of the retainer 30. In addition, the stud bolt 44 of a pressing ring 42 is inserted into each of the bolt insertion holes, 26, 84, 20, 34, and 40 of the second inner panel 22D, the base piece portion 81, the rear panel 14, the retainer 30, and the flange 38, respectively and the nut 46 is threaded onto a tip end of the stud bolt 44. Thereby the second inner panel 22D, the base piece portion 81, the rear panel 14, and the inflator 36 are fixed to the retainer 30.

Consequently, the peripheral edge portion of the opening 24 for the inflator of the second inner panel 22D is connected to the peripheral edge portion of the opening 16 for the inflator of the rear panel 14, and each of the outer peripheral edge portions of the first and second inner panels, 22C and 22D is connected together, and in addition, the center portion of the first inner panel 22C is connected to the front panel 12. Further, the tether portion 82 is connected to the rear panel 14 via the base piece portion 81, and each of the tether portions, 82 and 72 are connected, and in addition, the tether portion 72 is connected to the front panel 12 via the base piece portion 71.

Further, a continuum of the first and second inner panels 22C and 22D is configured to connect the front panel 12 and the rear panel 14 so as to set an interval therebetween to be relatively small, and a continuum of the tether portions, 72 and 82 is configured to connect the front panel 12 and the rear panel 14 so as to set the interval therebetween to be relatively large (such that the airbag 10A is formed to have a predetermined thickness on completion of expansion).

Other configurations of the airbag 10A and the airbag apparatus provided with the airbag 19A are identical to those in the above-described embodiment in FIGS. 1 through 4, and the same numbers in FIGS. 5 through 8 as those in FIGS. 1 through 4 denote the same elements in FIGS. 1 through 4.

In the airbag 10A, the first chamber 1 is also expanded first when the inflator 36 is activated when a car crash occurs, or the like, the gas in the first chamber 1 flows into the second chamber 2 passing through the continuous opening 27A, and the second chamber 2 is thereby expanded. The front panel 12 is detained at a rear panel 14 side by the continuum of the first inner panel 22C and the second inner panel 22D until the internal pressure of the first chamber 1 reaches the predetermined pressure, and an interval of the front panel 12 and the rear panel 14, namely a thickness of the airbag 10A remains to be relatively small. Accordingly, a volume of the second chamber 2 also remains to be relatively small at an early stage of the expansion of the airbag, and an internal pressure of the second chamber 2 is promptly caused to be high by the gas from the first chamber 1. Consequently, expansion of the second chamber 2 is accelerated.

Thereafter, when the internal pressure of the first chamber 1 reaches the predetermined pressure, the low strength portion 90 is broken and the first inner panel 22D is disunited into the front panel 12 side and the rear panel 14 side, and the thickness of the airbag 10A is increased. As a result, an impact caused when the occupant hits the expanded airbag 10A is sufficiently absorbed.

Further, in this embodiment, because the outwardly expanding motion of the front panel 12 to the occupant side is once stopped in the middle of expansion of the airbag by the continuum of the first inner panel 22C and the second inner panel 22D, and because the moving speed of the front panel 12 toward the occupant side is relatively gradual, the occupant comes into contact with the front panel 12 in a relatively soft manner.

Furthermore, in this embodiment, the dividing wall between the first chamber 1 and the second chamber 2 disappears due to separation of the first inner panel 22C and thereby entire internal pressure of the airbag 10A is caused to be substantially uniform on completion of expansion thereof.

In the airbag 10A, when the thickness of the airbag 10 is fully increased due to the separation of the first inner panel 22C, the continuum of the tether portions, 72 and 82 is strained between the front panel 12 and the rear panel 14, and the front panel 12 is prevented from expanding outward (protruding) in an excessive manner to the occupant side, as shown in FIG. 6.

Further, in this embodiment, although each of the tether portions 72 and 82 is respectively connected to the front panel 12 and the rear panel 14 via the base piece portions 71 and 81, the tether portions may be directly combined with the front panel 12 and the rear panel 14, respectively by means of stitching work or the like. Otherwise, the front panel 12 and the rear panel 14 may be connected by means of single-piece tethers.

In this embodiment, although the low strength portion is formed in the first inner panel 22C, the low strength portion may be formed in the second inner panel 22D. In addition, although the low strength portion is formed by means of the perforated line in this embodiment, the low strength portion may be formed by means of a device other than that described above.

The airbag may be constructed in a manner such that each of the outer peripheral edge portions of the first and second inner panels is combined by means of a low strength combination device such as a tear seam or the like, instead of forming the low strength portion in each of the inner panels. The combination by means of the low strength combination device is released when the internal pressure of the first chamber reaches a pressure not less than a predetermined pressure, and each of the inner panels is thereby disunited.

Each of the descriptions of the above-described embodiments is illustrative of the present invention, and the construction, shown in the drawings, is not to be construed as limiting the present invention.

In each of the above-described embodiments, although a center portion of the first inner panel or the vicinity thereof is directly combined with the front panel of the airbag by means of stitching work (seam) or the like, the first inner panel may be combined with the front panel through a connecting member such as a tether or the like.

The disclosure of Japanese Patent Application No. 2005-128148 filed on Apr. 26, 2005, is incorporated herein.

While the invention has been explained with reference to the specific embodiments of the invention, the explanation is illustrative, and the invention is limited only by the appended claims.

What is claimed is:

1. An airbag capable of being expanded by gas discharged from a gas generator, comprising:
   a front panel disposed at an occupant side;
   a rear panel disposed at a side opposite to the occupant side and having a rear panel opening for the gas generator at a center thereof, the front panel and the rear panel being combined at each of peripheral edge portions thereof;
   an inner panel partitioning an internal part of the airbag into a first chamber and a second chamber surrounding the first chamber, and having an opening to enable the first chamber to communicate with the second chamber, the inner panel comprising a first inner panel at a front panel side, and a second inner panel at a rear panel side, with a substantially center portion of the first inner panel being combined with the front panel, and each of the first inner panel and the second inner panel comprising overhanging portions respectively overhanging from an outer periphery thereof; and
   a combination device for combining a peripheral edge portion of the first inner panel with a peripheral edge portion of the second inner panel,
   the combination device comprising a first combination device for combining each of the peripheral edge portions of the first inner panel and the second inner panel in a low strength combination, and a second combination device for combining each of the overhanging portions of the first inner panel and the second inner panel in a high strength combination, the first combination device being capable of releasing the low strength combination when an internal gas pressure of the first chamber reaches a predetermined pressure.

2. The airbag according to claim 1, wherein said second inner panel includes an opening disposed in a substantially concentric configuration relative to the rear panel opening.

3. The airbag according to claim 1, wherein said first combination device completely surrounds the peripheral edge portions of the first and second inner panels, and the second combination device connects outer edge portions of the overhanging portions of the first and second inner panels.

4. An airbag apparatus comprising:
   an airbag according to claim 1; and
   a gas generator having a tip end portion and a gas discharge outlet, with at least the tip end portion and the gas discharge outlet being disposed in an internal part of the airbag.

5. An airbag capable of being expanded by gas discharged from a gas generator, comprising:
   a front panel disposed at an occupant side;
   a rear panel disposed at a side opposite to the occupant side and having a rear panel opening for the gas generator disposed at a center thereof, the front panel and the rear panel being combined at each of peripheral edge portions thereof;
   an inner panel partitioning an internal part of the airbag into a first chamber and a second chamber surrounding the first chamber, and having an opening to enable the first chamber to communicate with the second chamber, the inner panel comprising a first inner panel at a front panel side, and a second inner panel at a rear panel side, with a substantially center portion of the first inner panel being combined with the front panel;

a combination device for combining a peripheral edge portion of the first inner panel with a peripheral edge portion of the second inner panel in a low strength combination, the combination device being capable of combining the first inner panel and the second inner panel such that a distance between the front panel and the rear panel is a first interval until an internal gas pressure of the first chamber reaches a predetermined pressure, and of releasing the low strength combination when the internal gas pressure reaches the predetermined pressure, and a tether member for connecting the front panel and the rear panel, the tether member being capable of connecting the front panel and the rear panel such that after the release of the low strength combination, a second interval between the front panel and the rear panel is larger than the first interval.

6. The airbag according to claim 5, wherein the first inner panel or the second inner panel comprises a low strength portion capable of separating the first inner panel or the second inner panel into a front panel side and a rear panel side by breaking when the internal gas pressure of the first chamber reaches the predetermined pressure.

7. The airbag according to claim 5, wherein said second inner panel includes an opening disposed in a substantially concentric configuration relative to the rear panel opening.

8. The airbag according to claim 5, wherein each of the peripheral edge portions of the first inner panel and the second inner panel has a partially non-combined portion, and the first chamber is enabled to communicate with the second chamber via the non-combined portion.

9. An airbag apparatus comprising:

an airbag according to claim 5; and a gas generator having a tip end portion and a gas discharge outlet, with at least the tip end portion and the gas discharge outlet being disposed in an internal part of the airbag.

* * * * *